R. A. GARDNER.
TEA AND COFFEE POTS.

No. 190,135. Patented May 1, 1877.

WITNESSES: INVENTOR:

UNITED STATES PATENT OFFICE.

ROBERT A. GARDNER, OF PROVIDENCE, RHODE ISLAND.

IMPROVEMENT IN TEA AND COFFEE POTS.

Specification forming part of Letters Patent No. 190,135, dated May 1, 1877; application filed March 13, 1875.

*To all whom it may concern:*

Be it known that I, ROBERT A. GARDNER, of the city and county of Providence, in the State of Rhode Island, have invented a new and Improved Tea and Coffee Pot, of which the following is a specification:

My invention has for its object the employment of steam in the steeping of tea and coffee, and in keeping the same hot afterward without imparting an excessive degree of heat, such as would tend to injure the quality of the decoction. This is accomplished by means of a vessel, the interior of which is divided into an upper and lower compartment, the former being divided into two parts, the one for a receptacle of the tea or coffee, and having no communication with the other divisions, the second connecting directly with the lower or water compartment for the reception of steam. The pressure of the steam in the steam-chamber (and, consequently, the degree of heat) is regulated by valves. While the tea or coffee is boiling, the valve is sufficiently closed to obtain a greater pressure of steam, after which the valve is raised, allowing the steam to pass off more or less freely, according to the degree of temperature desired for the decoction. Thus, tea or coffee may be kept sufficiently hot for a long time without impairing its quality, and without giving it that pungent, bitter, and unpleasant taste which it acquires by standing for a considerable length of time over the fire.

I also construct a combined tea and coffee urn by first dividing the vessel into two parts from the top to the bottom, and making in each part the subdivisions above described. Tea and coffee can thus be made in the respective compartments at the same time, or either independently of the other.

I am aware that vessels have heretofore been constructed in which a body of water is raised to the requisite temperature, and imparts heat to an inclosed vessel wherein the tea or coffee is steeped; but my invention is designed to obtain the necessary heat from steam generated in one compartment, and imparting its heat to that containing the tea or coffee. In mine only a comparatively small quantity of water is needed for making the steam, leaving the upper portion of the water-chamber, as well as the steam-chamber, to be filled with the steam, and relieving the vessel of much unnecessary weight. Thus, it is not required to heat a great body of water, consuming, by so doing, much fuel and time; but a saving of both time and fuel is effected, while the temperature is kept entirely within control.

In the accompanying drawings, like letters indicate like parts.

Figures 1, 2:
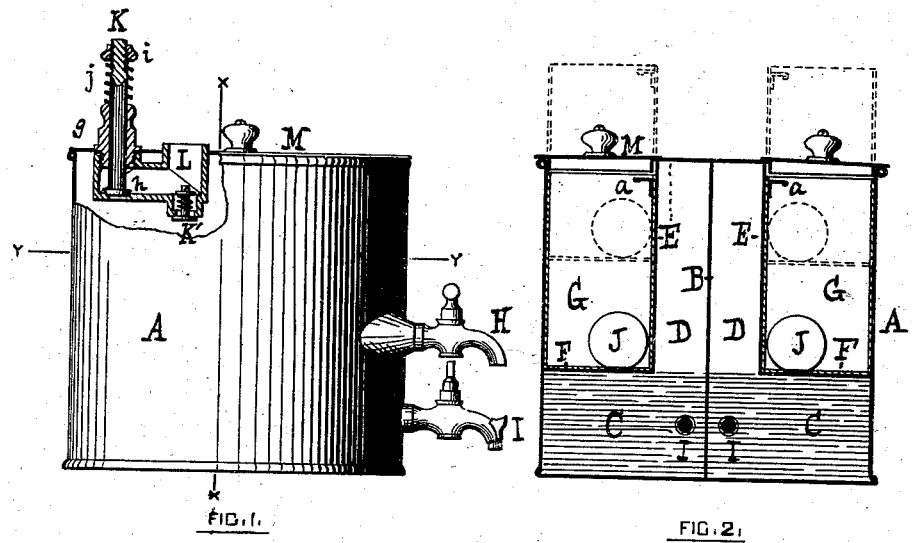
Figure 3:
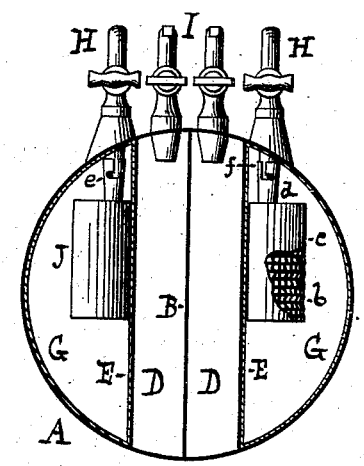
Figures 4, 5:
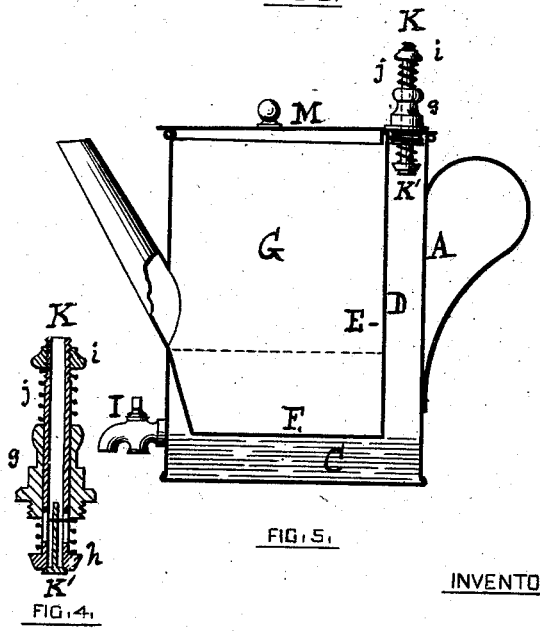

Figure 1 is a side elevation of my combined tea and coffee urn. Fig. 2 is a vertical section of the same on the line $x\,x$. Fig. 3 is a transverse section of the same on the line $y\,y$. Fig. 4 shows the valve in detail. Fig. 5 shows the application of my invention to a separate vessel for tea or coffee.

The vessel A is divided by the partition B from top to bottom into two independent compartments. Within each of these is formed a water-chamber, C, and a close steam-chamber, D, by means of partitions E and F, as fully shown in Figs. 2, 3, and 5. A receptacle, G, for the tea or coffee, fits into the space thus made between the chambers aforesaid and the outer walls of the vessel, which receptacle is easily withdrawn from its case, so formed, by means of its handle $a$ attached to it. The faucets H H connect, respectively, with the receptacles G G, and other faucets or cocks I I with the respective water-chambers C C. Within the receptacle G is a cylindrical strainer, J, provided with woven or braided wire $b$, and covered with coarse cloth or canvas $c$ to prevent the coffee-grounds or tea-leaves from passing through the faucets. These strainers are adjustable. They have a neck, $d$, in which is a slot to receive the pin $e$ on the outlet $f$ of the receptacle G, and are thus held in position. They can be readily removed for the purpose of cleaning whenever necessary, and so have a great advantage over strainers of wire or perforated metal soldered solidly to the walls of the vessel, which latter cannot be properly cleaned, especially in the joints, and are liable to become clogged. The strainer is made cylindrical, and of such a size as to serve for a reservoir for the tea or coffee after straining, so that as soon as the faucet is opened, there is a ready flow of the clear liquid. As the pressure of the steam within its chamber needs to be different at different times, for the purposes already stated, I furnish each steam-chamber with valves K K, which are held in place by standards $g$, and have their disks $h$ seated in corresponding apertures in the walls of the steam-chest.

In the drawings, I show two forms in which these valves may be made—the one solid, the other tubular. These, by their own weight, close the openings, and are raised therefrom by the pressure of the steam sufficiently to admit of its proper escape.

If it is desired to reduce the pressure, and thus diminish the temperature, the nut $i$ may be operated by its screw-thread, increasing the pressure of the spiral spring $j$ against the nut, and so raising the valve from its seat. In either case a second valve, K', is needed to provide against condensation of steam within the chambers. The form, location, and arrangement of this valve fully appear in the drawings.

In Fig. 1 the valve K' is shown in position within the aperture L. In this case the valve K is solid.

In Fig. 4 the valve K' is shown in combination with the tubular valve K, to perform the same function. Through the opening of the tubular valve or its aperture, wherein it is inserted, or through the aperture L, (as the case may be,) the water is poured into its chambers, the valve being lifted out of its seat, and allowing the water to flow through. The covers M M close the receptacles G G.

I claim as a novel and useful invention, and desire to secure by Letters Patent—

1. The removable strainer J, constructed as described, to constitute also a reservoir for the filtered or strained liquid, in combination with the outlet or spout of a tea or coffee urn, substantially as specified.

2. In an apparatus for making tea or coffee, the combination of the following instrumentalities: a water space or boiler, C, for generating steam, a steam chest or space, D, connecting with the boiler, and provided with valves K K' to control the pressure of the steam, and a chamber or receptacle, G, in which the tea or coffee is steeped and retained, receiving its heat from the steam-chest, substantially as described.

ROBERT A. GARDNER.

Witnesses:
A. B. SEARLES,
L. O. ROCKWOOD.